United States Patent Office

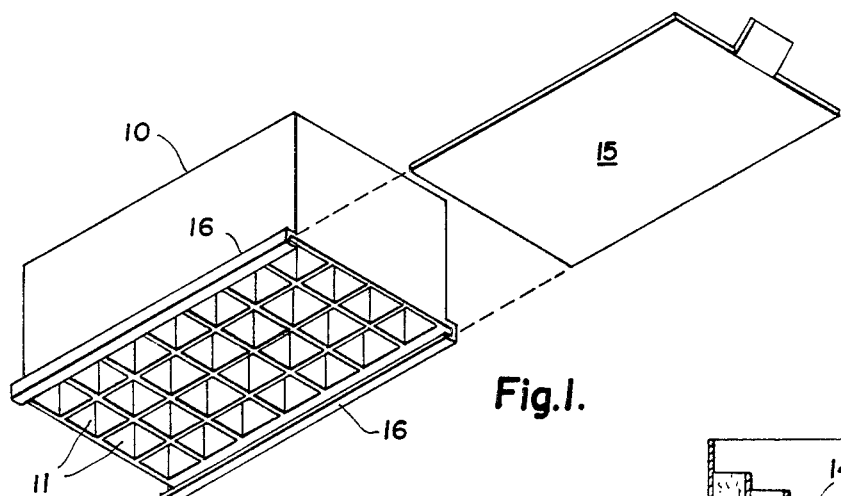
Fig.1.
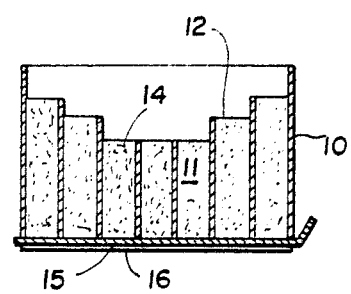
Fig.2.
Fig.3.
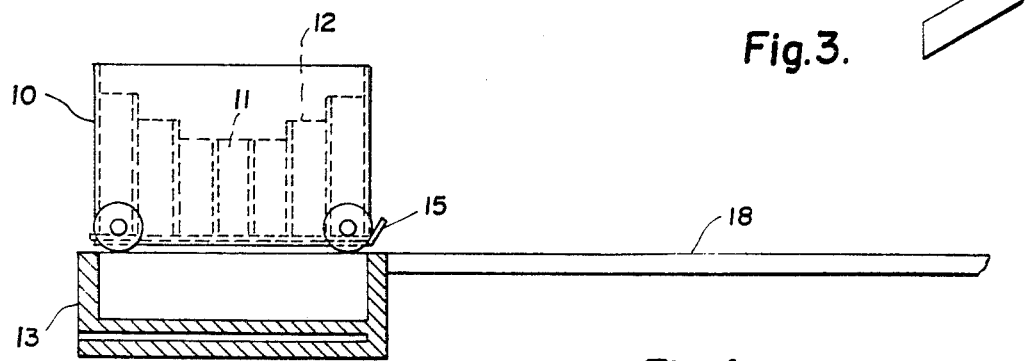
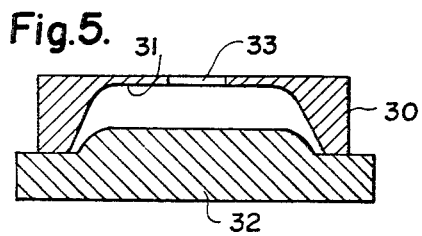
Fig.5.
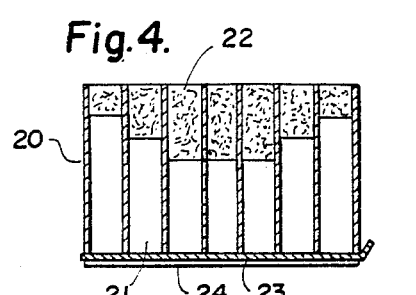
Fig.4.
INVENTORS.
JOSEPH IANUZZI
ROBERT P. HABGOOD, JR.
their ATTORNEYS.

3,473,204
Patented Oct. 21, 1969

3,473,204
LOADING TOOLS
Joseph Ianuzzi and Robert P. Habgood, Jr., Bradford, Pa., assignors to Plexowood, Inc.
Filed Feb. 27, 1967, Ser. No. 618,697
Int. Cl. B28b *13/02*
U.S. Cl. 25—103       5 Claims

ABSTRACT OF THE DISCLOSURE

A loading tool for molds handling generally non-flowable wood chip and resin mixtures comprising a housing having an internal void defining the peripheral outline of an article to be molded and adapted to receive a mixture to be molded and to deposit it in a mold, and means in the housing defining a variable thickness of configuration of the mixture necessary for the final product contour.

---

This invention relates to loading tools and particularly to loading tools for wood molding. In wood molding, wood chips are mixed with a plastic resin binder, placed in a heated mold and compressed under high pressure.

The primary difference between molding plastics which are wood filled and molding wood which uses resins (plastics) for binding agents is the degree to which each component is present in the mixture. Secondarily, the size and configuration of the wood particle is generally different (although not necessarily as in the case of molding with wood flour).

In plastics molding the amount of wood filler (most often in the form of flour) is usually 40% or below. Such mixtures are normally capable of considerable flow under the pressing conditions of temperature and pressure encountered. In this case the materials can be made to fill the mold easily without undue problem in placement within the mold cavity. It will even be possible to insert this material by injection since flow is sufficient in some mixes.

In three-dimensional molding of wood flakes (or wood flour) with low percentages of resin, the flow properties of the mix are poor, and for practical purposes of mold filling flow can be considered to be equivalent to zero. Generally, with more resin, flow is improved. In the wood molding class of product, however, the entire range of normally used resin percentages present the molder with what is essentially a no-flow condition. This then necessitates that the material be deposited in the mold very accurately, so that the proper amount of material is placed in each location within the mold cavity so that after compression the desired density is formed in these different areas. The density, of course, then depends on the height of the wood flake mixture before compression compared to height after compression (compression ratio). Since no appreciable flow exists, varying densities can be produced within areas which lie very close to each other independent of the relative thickness of these adjoining sections. Likewise, uniform densities can be maintained in sections of varying thickness by controlling the compression ratio.

The present invention relates to loading tools which control the height of the wood flake mixture at various positions within the mold and, in cooperation with the height configurations of the mold thus control effective compression ratio of the flakes at each point in the mold. This in turn affords local control of density and hence of local properties in the part. Such control permits a molded part to be tailored to give unique characteristics not available in a homogeneous single piece of wood or plastic. Such characteristics as edge hardness, screw holding capability, impact resistance, beam strength, weight, moisture resistance, heat transmission, etc. may be varied from point to point within the molded part.

Broadly stated we provide a housing adapted to receive a mixture of wood chips and resin to be molded, said housing having means defining the varying thickness configurations necessary for a given product in terms of a void within said housing, and being adapted to deposit a contoured charge of wood chip mixture in a mold when removed therefrom. Said housing may be top or bottom filled as hereafter described and may be loaded on the mold or spaced from the mold and moved to the mold in loaded condition.

Preferably we provide an internally compartmented housing having a removable bottom closure, said housing having the external configuration of the mold to be filled, said closure being adapted to slide from beneath the housing to release the contents of said housing, said compartments being contoured to hold a quantity of wood chip compositions to provide the necessary height configuration at each selected point in the mold. Preferably means are provided for moving the housing from a filling station to the mold such as a moving crane and depending yoke or by mounting on a trolley movable into the press. The compartments may be contoured by filling the top with a solid filler or by cutting the tops of the compartments to provide a contoured top egg crate like construction.

In the foregoing general description of our invention we have set out certain objects, purposes and advantages of our invention. Other objects, purposes and advantages of the invention will be apparent from a consideration of the following description and accompanying drawings in which:

FIGURE 1 is an isometric, exploded bottom view of a loading tool according to my invention;

FIGURE 2 is a section on the line II—II of FIGURE 1;

FIGURE 3 is a side elevational view partly cut away of the tool of FIGURES 1 and 2 showing the tool ready to deposit a charge in a mold;

FIGURE 4 is a section through a second embodiment of my invention using a solid filler-egg crate contour; and FIGURE 5 is a section through a third embodiment of the tool according to my invention using a solid filler contour forming device.

Referring to the drawings we have illustrated in FIGURES 1–3 a housing 10 having compartments 11 in the interior in an egg crate design. The tops 12 of the compartments are cut to a contour such as to define the relative heights of wood chips to be deposited in a mold 13. Wood chips and resin mixture 14 is placed in the compartments on top of sliding bottom 15 held in grooves 16 in the sidewalls of the housing and leveled to the top of each compartment.

The operation of the device of FIGURES 1–3 is as follows. Wood chip mixture 14 is placed in the compartments and leveled to the heights of adjointment compartment walls. The housing 10 is placed on the bottom mold 13 and the sliding bottom 15 is withdrawn depositing the wood chip mixture onto the bottom mold in varying thickness corresponding to the varying heights of compartments 11. The housing 10 is then removed and the top mold brought down onto the chip mixture, which is compressed and heated to form the final article. The housing 10 may be manually loaded and placed on the mold or it may be moved into position on the mold by means of the trolley tracks 18 extending from a loading hopper 19 to mold 13.

In the embodiment illustrated in FIGURE 4 we provide a housing 20 having compartments 21 of egg crate type as in FIGURES 1–3. In this embodiment the compartment tops are filled with a solid filler member 22 defining the amount of wood chip mixture which the housing can accept. The chip mixture is filled into housing 20 with housing in "upside down" on top of the filler members 22, the sliding door 23 is inserted into grooves 24 in the sidewalls of housing 20 to cover the chip mixture. The housing is inverted over the mold and the sliding door 23 removed to deposit the chip mixture into the bottom mold precisely as in the case of FIGURES 1–3.

In FIGURE 5 we have illustrated a third form of housing 30 having a top 31 contoured to the top of the chip mixture to be placed on bottom mold 32. A filler opening 33 is provided in the top of the mold through which the wood chip mixture may be inserted.

The operation of the apparatus of FIGURE 5 is as follows. A wood chip molding mixture is fed through opening 33 into the interior of housing 30 onto bottom mold 32. The chips are pushed into all parts of the housing by hand to fill all voids in the housing and leveled at the opening. The housing 30 is removed and the top mold lowered over the contoured chip mixture.

While we have illustrated and described certain preferred embodiments of my invention with reference to the foregoing specification, it will be understood that this invention may be otherwise embodied and practiced within the scope of the following claims.

We claim:

1. A wood chip resin loading tool for molds comprising a housing having an internal void defining the peripheral outline of an article to be molded and adapted to receive a mixture of wood chips and resin to be molded and to deposit said mixture in a mold, said housing being divided into a plurality of separate compartments of varying effective depth defining the variable vertical thickness configuration of a loose chip mixture necessary for a given product under selected conditions of pressure and temperature.

2. A tool as claimed in claim 1 wherein the separate compartments are provided with filler means at the top limiting the volumetric capacity of said compartments.

3. A tool as claimed in claim 1 wherein the separate compartments have variable wall heights defining the volume of each said compartment.

4. A tool as claimed in claim 1 wherein the housing is provided with a removable sliding door extending across all compartments.

5. A tool as claimed in claim 1 wherein the separate compartments are formed by spaced vertical dividers within the housing.

References Cited

UNITED STATES PATENTS 3,377,964    4/1968    Bell et al.
1,709,755    5/1929    Straub _____ 25—103

J. SPENCER OVERHOLSER, Primary Examiner

DE WALDEN W. JONES, Assistant Examiner

U.S. Cl. X.R.

100—215; 249—132

UNITED STATES PATENT OFFICE
CERTIFICATE OF CORRECTION

Patent No. 3,473,204                                    October 21, 1969

Joseph Ianuzzi et al.

It is certified that error appears in the above identified patent and that said Letters Patent are hereby corrected as shown below:

Column 2, line 16, after "filled" insert -- and adapted slip fit within the top of the mold to be filled --; line 57, "adjointment" should read -- adjoining --.

Signed and sealed this 21st day of April 1970.

(SEAL)
Attest:

Edward M. Fletcher, Jr.                            WILLIAM E. SCHUYLER, JR.
Attesting Officer                                       Commissioner of Patents